United States Patent
Cheng

(10) Patent No.: US 7,283,824 B2
(45) Date of Patent: Oct. 16, 2007

(54) METHOD OF LOCATION DISPLAY FOR MOBILE STATION

(75) Inventor: Steven D. Cheng, San Diego, CA (US)

(73) Assignee: Benq Corporation, Taoyuan (TW)

( * ) Notice: Subject to any disclaimer, the term of this patent is extended or adjusted under 35 U.S.C. 154(b) by 1154 days.

(21) Appl. No.: 10/411,501

(22) Filed: Apr. 10, 2003

(65) Prior Publication Data

US 2004/0203933 A1 Oct. 14, 2004

(51) Int. Cl.
*H04Q 7/20* (2006.01)
(52) U.S. Cl. ...................... 455/442; 455/440
(58) Field of Classification Search ........... 455/442
See application file for complete search history.

(56) References Cited

U.S. PATENT DOCUMENTS

| | | | | |
|---|---|---|---|---|
| 4,531,235 A | * | 7/1985 | Brusen | .................. 455/273 |
| 5,894,599 A | * | 4/1999 | Ishida et al. | .............. 455/456.6 |
| 6,424,643 B1 | * | 7/2002 | Gutowski | .................. 370/342 |
| 6,512,931 B1 | * | 1/2003 | Kim et al. | .................. 455/522 |
| 2002/0155843 A1 | * | 10/2002 | Bahl et al. | ................... 455/456 |
| 2004/0058678 A1 | * | 3/2004 | deTorbal | ..................... 455/437 |

* cited by examiner

*Primary Examiner*—Creighton Smith
(74) *Attorney, Agent, or Firm*—Snell & Wilmer L.L.P.

(57) ABSTRACT

The present invention relates to a method for determining a nearest base station with respect to a mobile station from M base stations. First, the mobile station compares strengths of M signals received from M base stations with each other to determine a first base station, which has a strongest signal among M signals. Then, P strength differences of the strongest signal with P signals selected from the other (M-1) signals respectively are obtained. Finally, the first base station is determined as being the nearest base station when all strength differences are respectively larger than a predetermined value.

23 Claims, 9 Drawing Sheets

METHOD OF LOCATION DISPLAY FOR MOBILE STATION

FIELD OF THE INVENTION

The present invention relates to a method for determining a nearest base station with respect to a mobile station from M base stations in a telecommunication network.

BACKGROUND OF THE INVENTION

Many kinds of mobile stations, such as a mobile phone, are widely used today. A current development trend of the mobile station is to provide one mobile station with multi-function, i.e. display of current location on the panel of mobile phones.

U.S. Pat. No. 5,894,599, issued to Ishida, et al. discloses a mobile station for use in radio communication with a station selected from a plurality of base stations. Each base station has been assigned a station number beforehand. Position data corresponding to the station numbers are memorized in a RAM of the mobile station. When the mobile receives a signal with a station number transmitted from the selected base station, the corresponding position datum will be displayed on the mobile station:

However, in the U.S. Pat. No. 5,894,599, nothing is disclosed about how to select the selected base station. As people skilled in the art may know, a mobile station is not necessary to camp on the nearest base station. In other words, there is high risk that the camped-on base station, i.e. the selected base station, is not the nearest base station relative to the mobile station.

SUMMARY OF THE INVENTION

It is an aspect of the present invention to determine the nearest base station relative to a mobile station.

It is another aspect of the present invention to provide a location information to a user via a mobile station.

It is another aspect of the present invention to provide a location information to a user by an existed equipment.

In order to determine the nearest base station relative to the mobile station from M base stations, first, the mobile station receives M signals from M base stations respectively. Then strengths of M signals are compared with each other to determine a first base station, which has a strongest signal among M signals. The other (M-1) base stations have the other (M-1) signals. Next, P strength differences of the strongest signal with P signals selected from the (M-1) signals respectively are calculated. Finally, the first base station is determined as being the nearest base station when all strength differences are respectively larger than a predetermined value.

This and other aspects of the present invention will become clear to those of ordinary skill in the art after having read the following detailed description of the preferred embodiment which is illustrated in the various figures and drawings.

DETAILED DESCRIPTION

Figure 1:
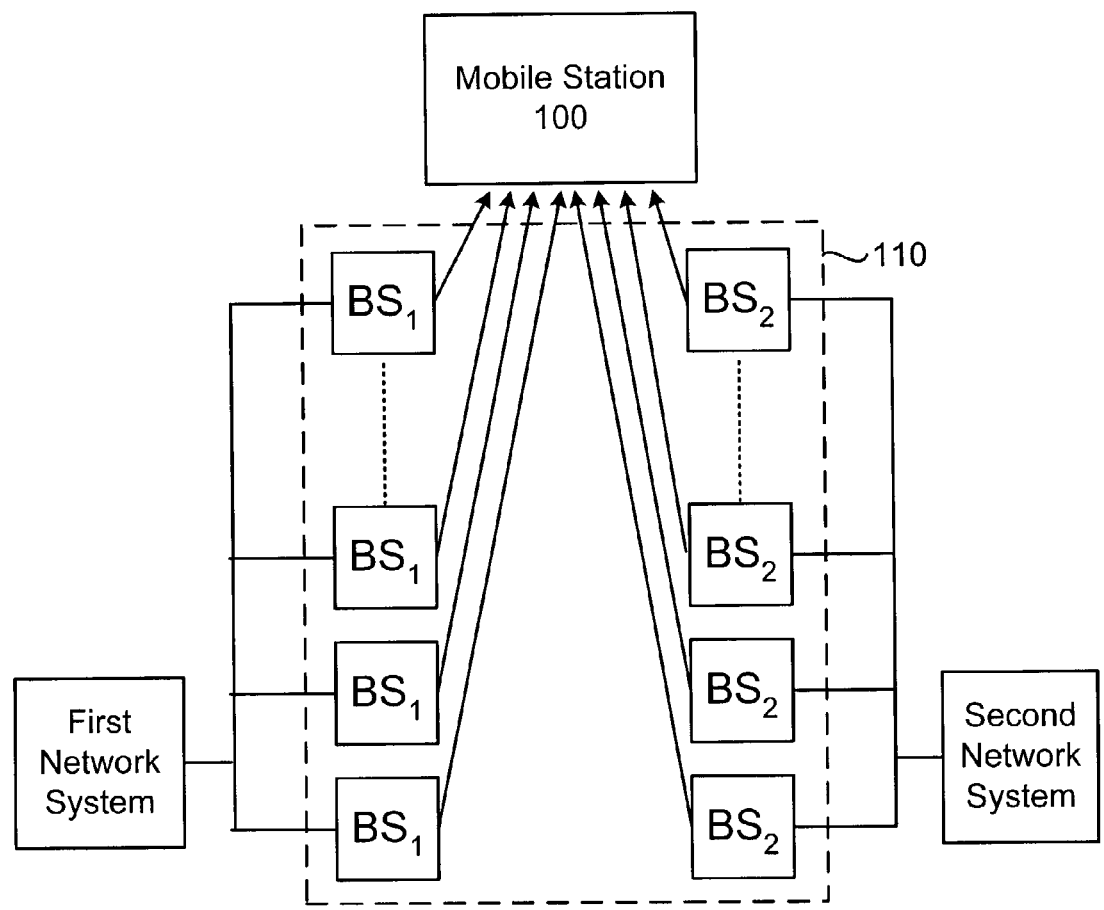
FIG. 1 shows a block diagram of an exemplary system.

The present invention provides a method for determining a nearest base station with respect to a mobile station 100 from M base stations (BS) 110, as FIG. 1 shows. The preferred embodiment of the mobile station 100 may be a mobile phone. However, in another embodiment, the mobile station 100 may be a personal digital assistant (PDA) or other apparatus with a communication module. In FIG. 1, a first group ($BS_1$) of M base stations 110 belongs to a first network system, and a second group ($BS_2$) of the M base stations 110 belongs to a second network system. The first network system may be a home network system for the mobile station 100 to camp on, and the second network system may be a visiting network system for the mobile station 100 to camp on. Generally, the first and the second network systems may belong to different system providers. However, those two systems also may belong to a single system provider.

Figure 2A:
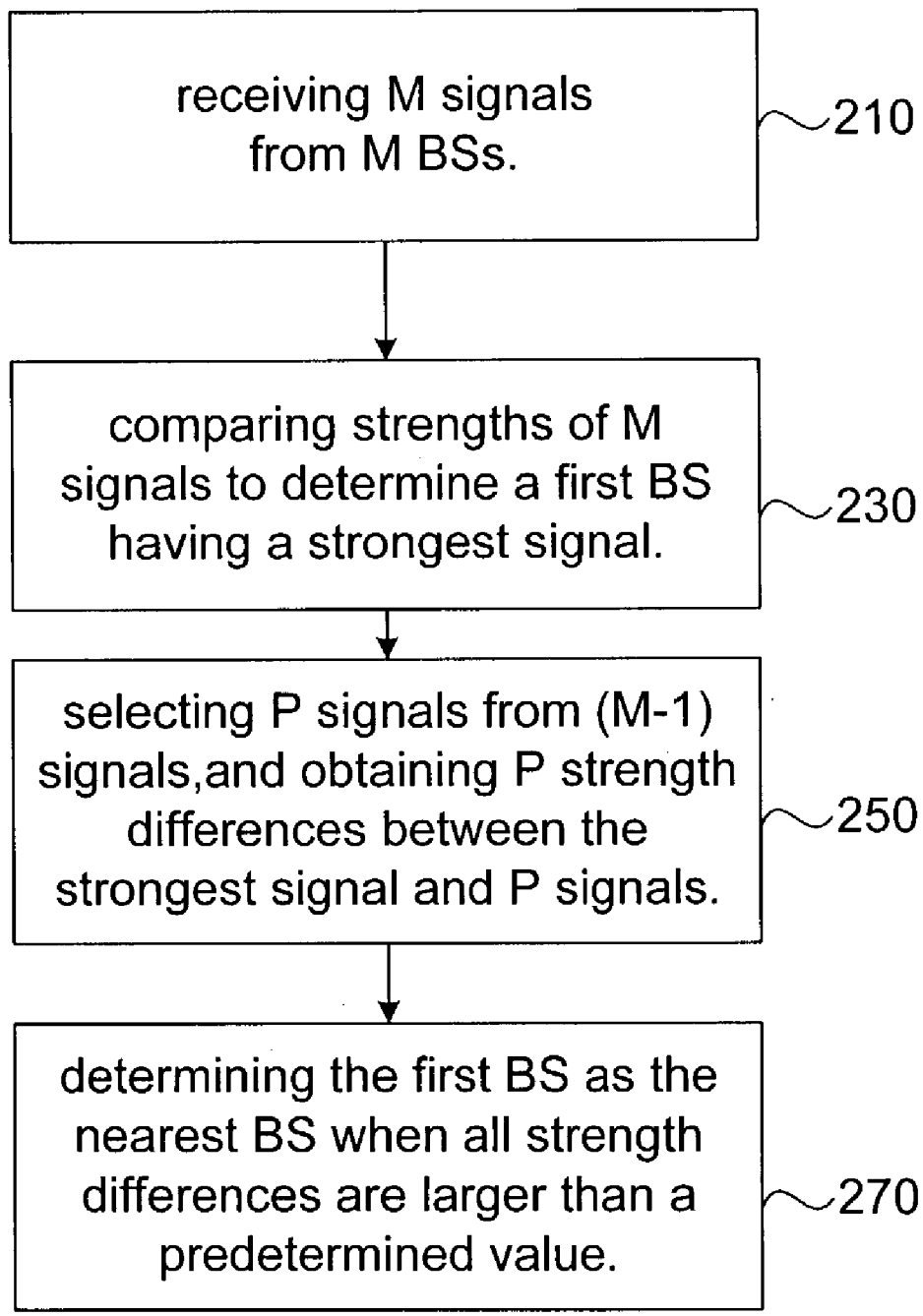
FIG. 2a shows a flow chart of an embodiment of the invention applicable to system in FIG. 1.

Please refer to FIG. 2a. FIG. 2a shows a flow chart of an embodiment of the invention. First, in step 210, the mobile station 100 receives M signals from M base stations 210 respectively. M is an integer larger than 1. In this embodiment, the signal may be a broadcast control channel (BCCH) signal. However, in other embodiments, the signal may be a radio frequency signal, a base band signal or a low-power signal.

Figure 3:
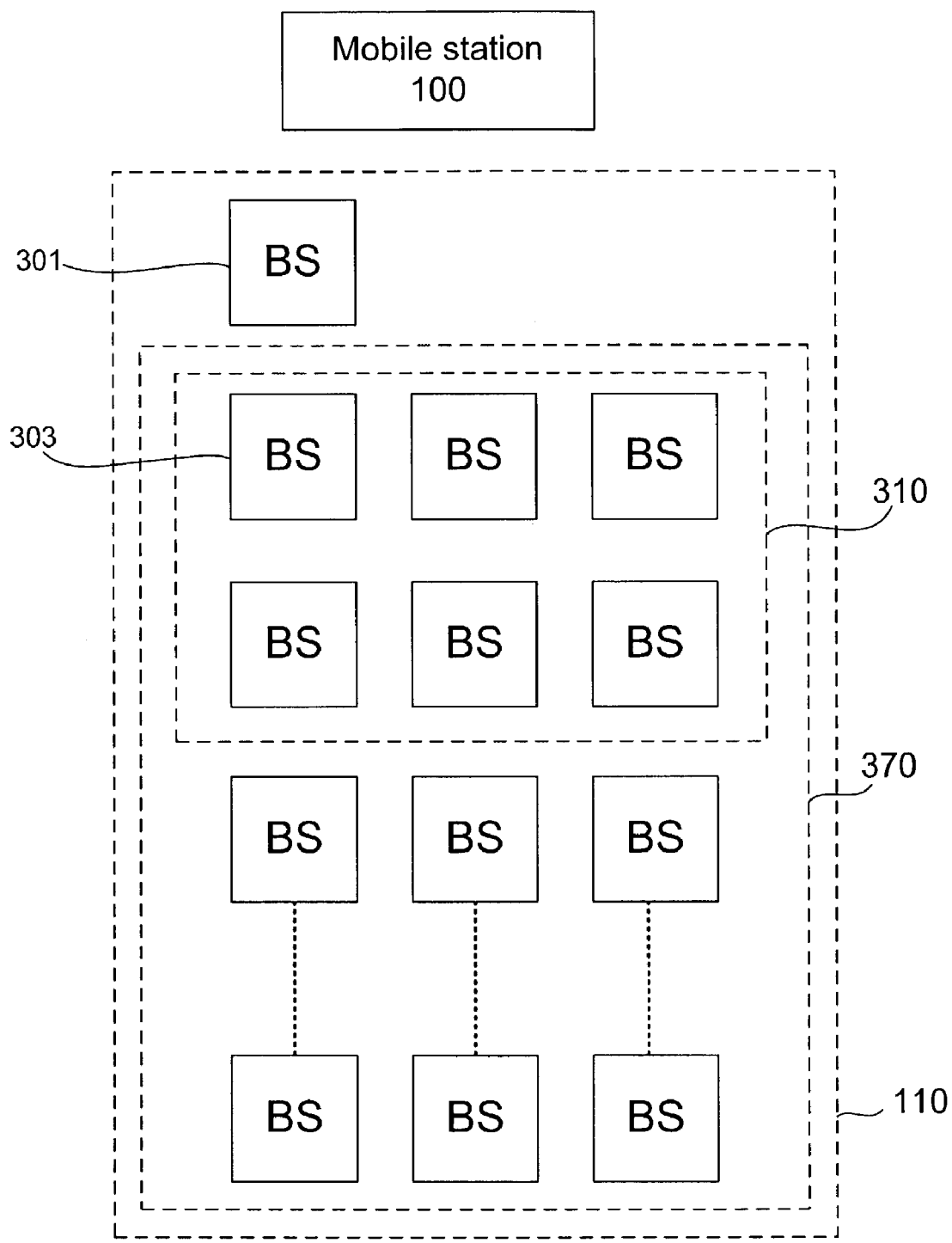
FIG. 3 shows a system of M base stations.

Subsequently, in step 230, strengths of M signals are compared with each other to determine a first base stations 301, as FIG. 3 shows, which has a strongest signal among M signals. Shown in FIG. 3, other (M-1) base stations 370 respectively transmit (M-1) signals. That is, the M base stations 110 are divided into two parts, one part includes the first base station 301, and the other pale includes the (M-1) base stations 370. In one embodiment, a receive signal strength indication (RSSI) may be obtained as an indication of the strength of signals. In other embodiment, the strength of signals also may be represented by other similar and/or equivalent indications.

In step 250, P signals are selected from the (M-1) signals. In this embodiment, P signals, which have larger strengths than those of remaining (M-P-1) signals, are selected. However, in other embodiments, P signals may be selected by other method, such as random process. The P signals respectively belong to P base stations 310, as FIG. 3 shows. Then, in step 250, P strength differences are respectively obtained by subtracting each of the P signals from the strongest signal.

In step 270, when all of the P strength differences obtained in step 250 are respectively larger than a predetermined value, the first base stations 301 is determined as being the nearest base station corresponding to the mobile station 100. In one embodiment, the predetermined value in step 270 is determined by considering the signal interference effect among M signals, etc.

Figure 2B:
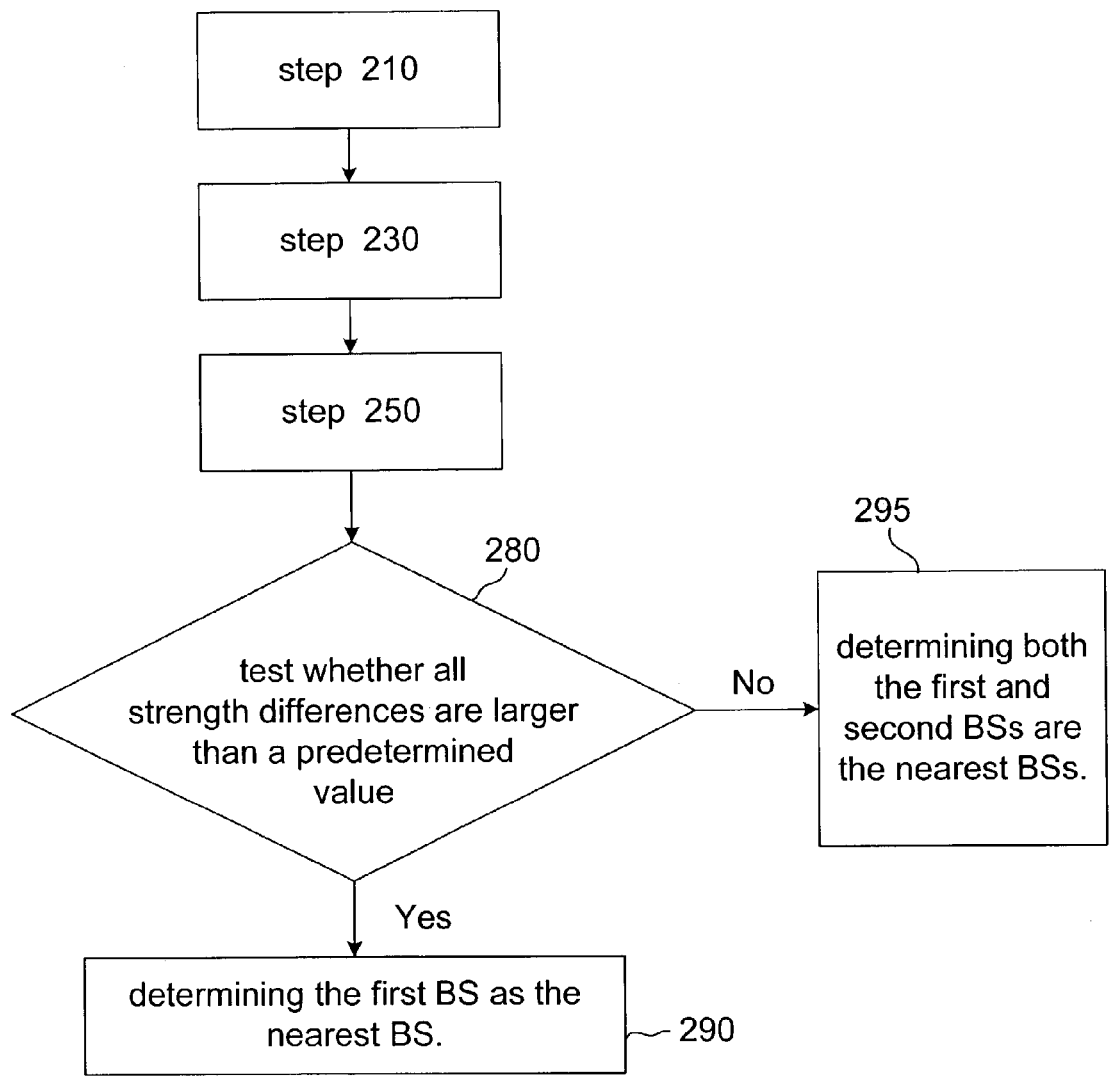
FIG. 2b shows a flow chart of another embodiment of the invention.

In another embodiment, as FIG. 2b shows, the details of steps 210, 230, and 250 are respectively identical to those steps shown in FIG. 2a. After step 250, in step 280, the P differences are tested to determine respectively whether they are larger than a predetermined value. The predetermined value is determined by considering the signal interference effect among M signals, etc. If the test is yes, then in step 290, the first base stations 301 is determined as being the nearest base station relative to the mobile station 100. On the contrary, if it is no in step 280, then in step 295, both the first base station 301 and a second base station 303 are determined as being the nearest base stations, wherein the strength difference between strongest signal and the signal from the second base station 303 is smaller than the predetermined value.

Figure 4:
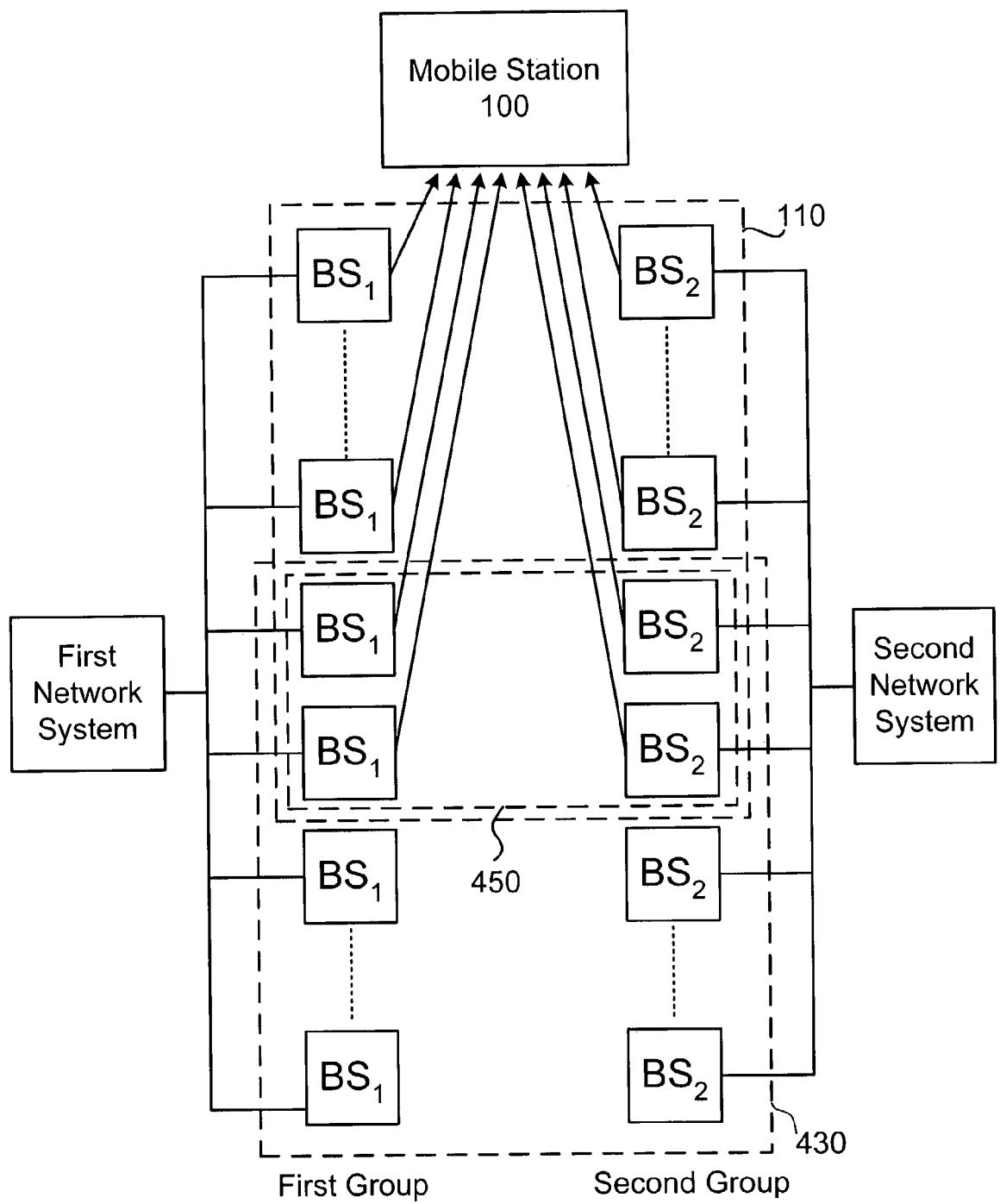
FIG. 4 shows a block diagram of another exemplary system.

FIG. 4 shows a block diagram of another exemplary system. This system includes M base stations 110, which respectively transmit M signals to the Mobile station 100. In addition, this system also includes N base stations 430 whose translation relationships between identifications and location informations are pre-stored in the mobile station 100. Because of the size limitation of an internal memory of the mobile station 100 or other reason, the N base stations 430 and the M base stations 110 merely have Q common base stations 450 in the system shown in FIG. 4. However, in other systems, the N base stations 430 may involve all of the M base stations 110, i.e. the Q base stations 450 corresponds to the M base stations 110.

In FIG. 4, a first group ($BS_1$) of base stations belongs to a first network system, and a second group ($BS_2$) of base stations belongs to a second network system. The first network system may be a home network system for the mobile station 100 to camp on, and the second network system may be a visiting network system for the mobile station 100 to camp on. Generally, the first and the second network systems may belong to different system providers. However, those two systems also may belong to a single system provider.

Figure 5:
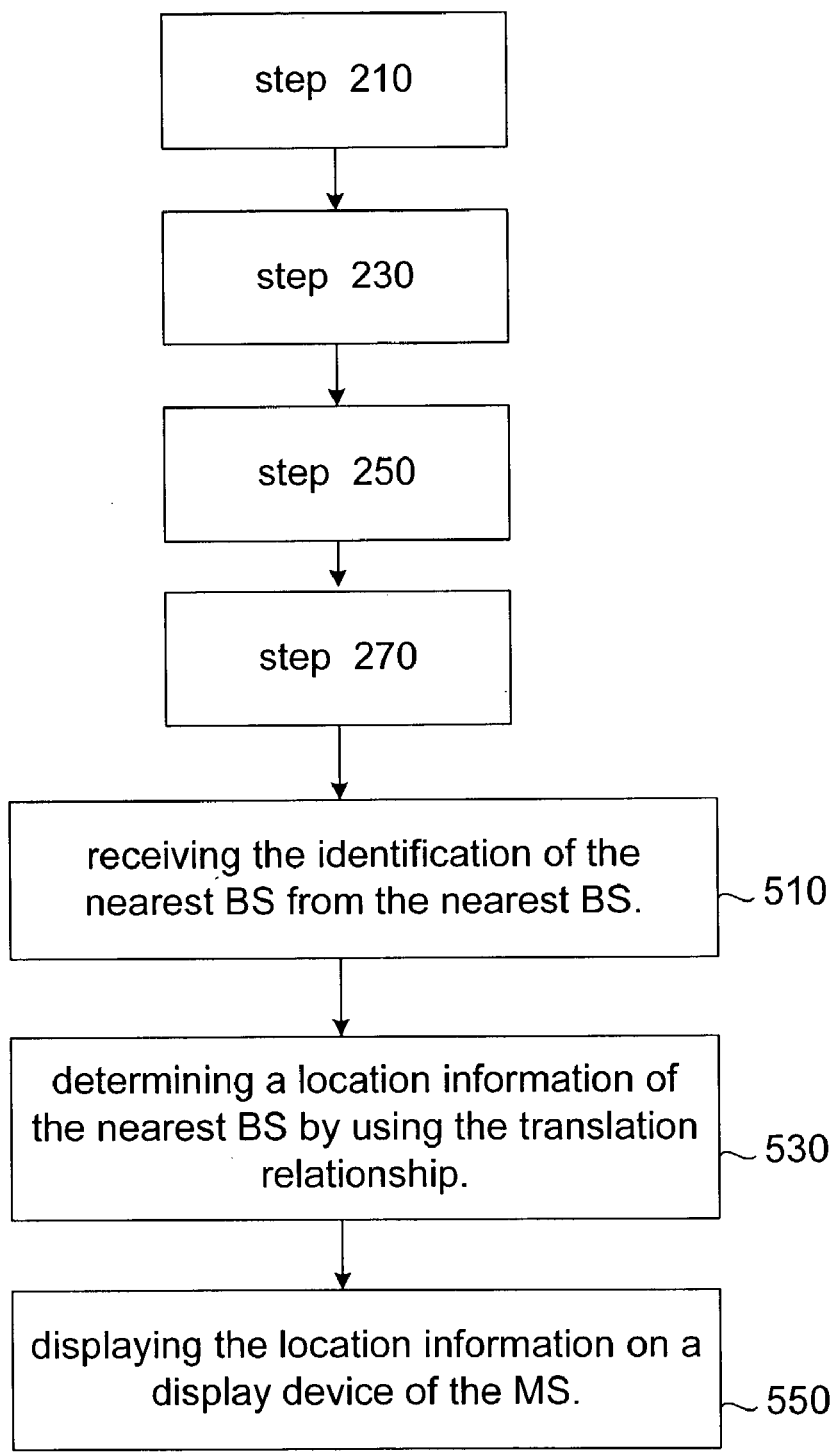
FIG. 5 shows a flow chart of the embodiment applicable to system shown is FIG. 4.

As FIG. 5 shows, besides steps 210, 230, 250 and 270, the embodiment corresponding to system shown in FIG. 4 further includes steps 510, 530, and 550. In step 510, the mobile station 100 receives the identification of the nearest base station from the nearest base station. In this embodiment, the identification may be various kinds of codes or other formations.

In step 530, a location information corresponding to the identification of the nearest base station may be determined by using the pre-stored translation relationship. The location information may include the name of administrative division, such as country, province, county, city, even the accurate address. The location information also may include the name of geological area, such as the name of a mountain. In addition, the location information may include diverse geological information, such as the absolute height or the distance between the nearest base station and a predetermined destination.

Figure 6A:
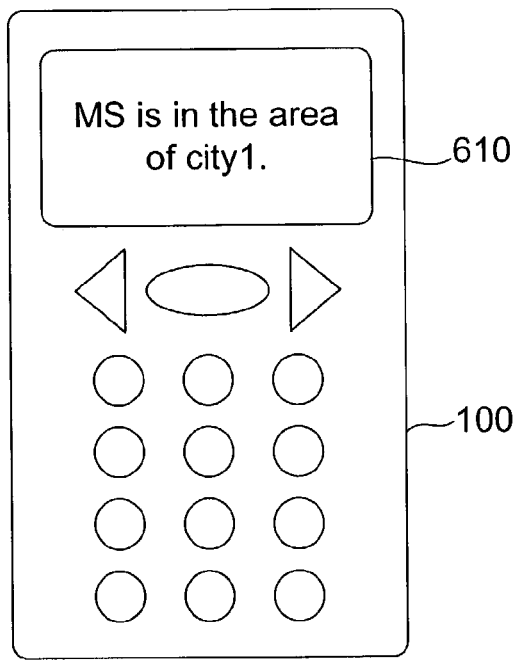
FIG. 6a shows an embodiment of the location display.
Figure 6B:
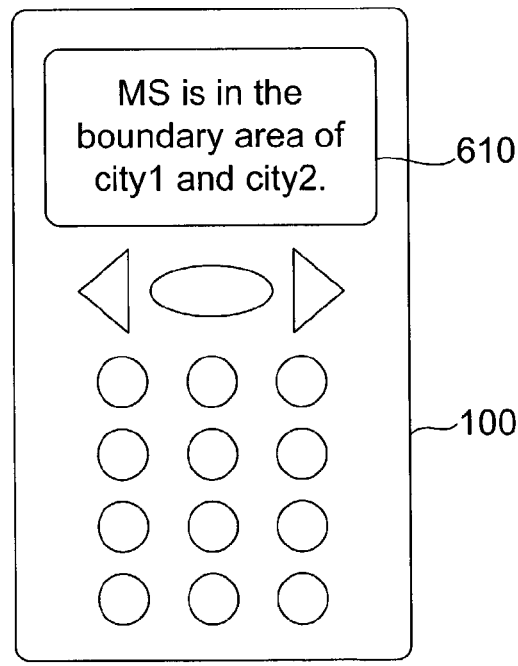
FIG. 6b shows another embodiment of the location display.

In step 550, the location information may be output on an output device 610 of the mobile station 100. In this embodiment, the output device 110 may be an LCD display area, as FIG. 6a shows. However, in other embodiments, the output device 610 may be a speaker for outputting voice to output the location information. If there are more than one nearest base stations, all of the location informations of the nearest base stations may be displayed on the output device 610, as FIG. 6b shows.

Figure 7:
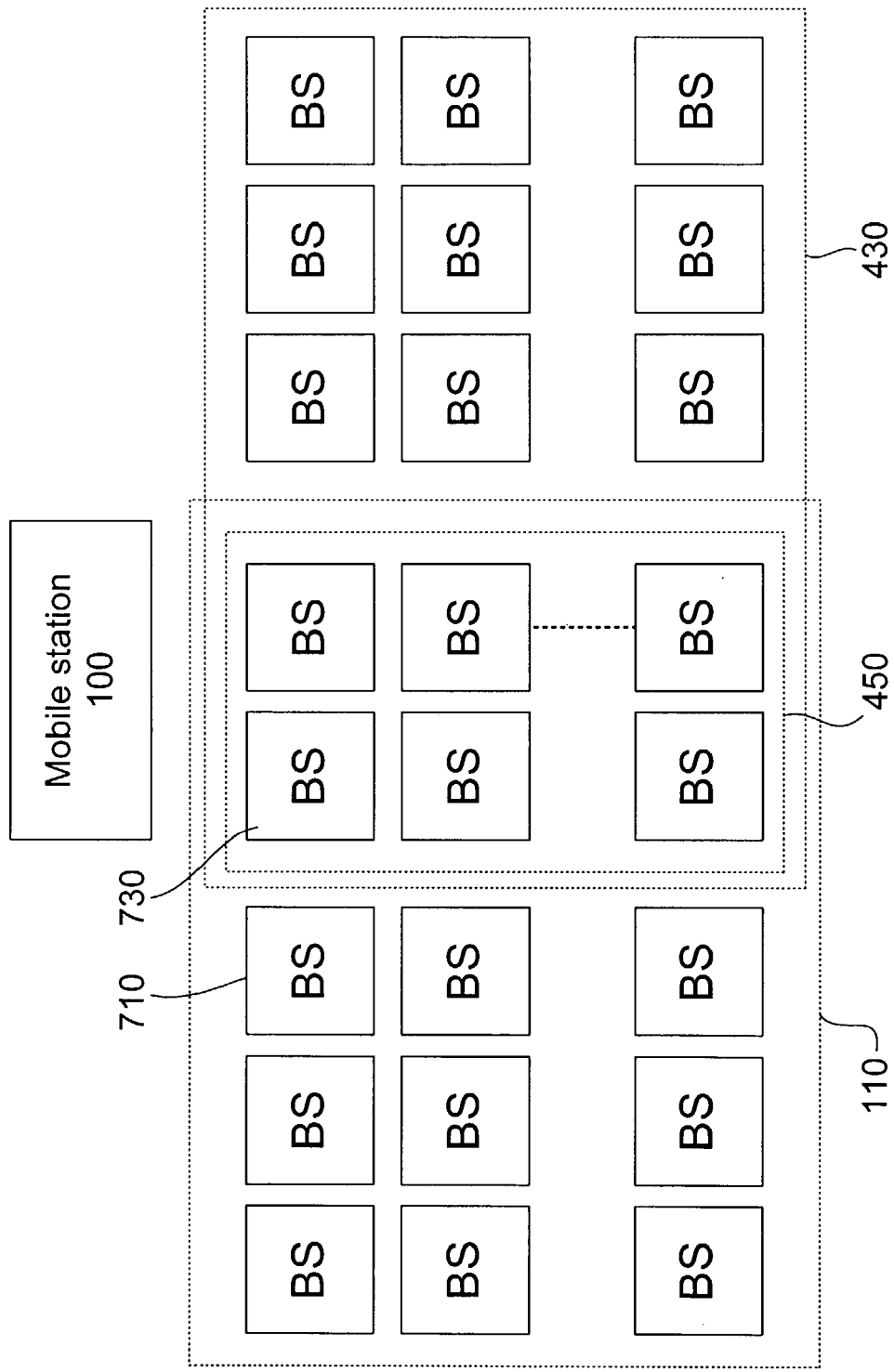
FIG. 7 shows a block diagram of still another exemplary system.
Figure 8:
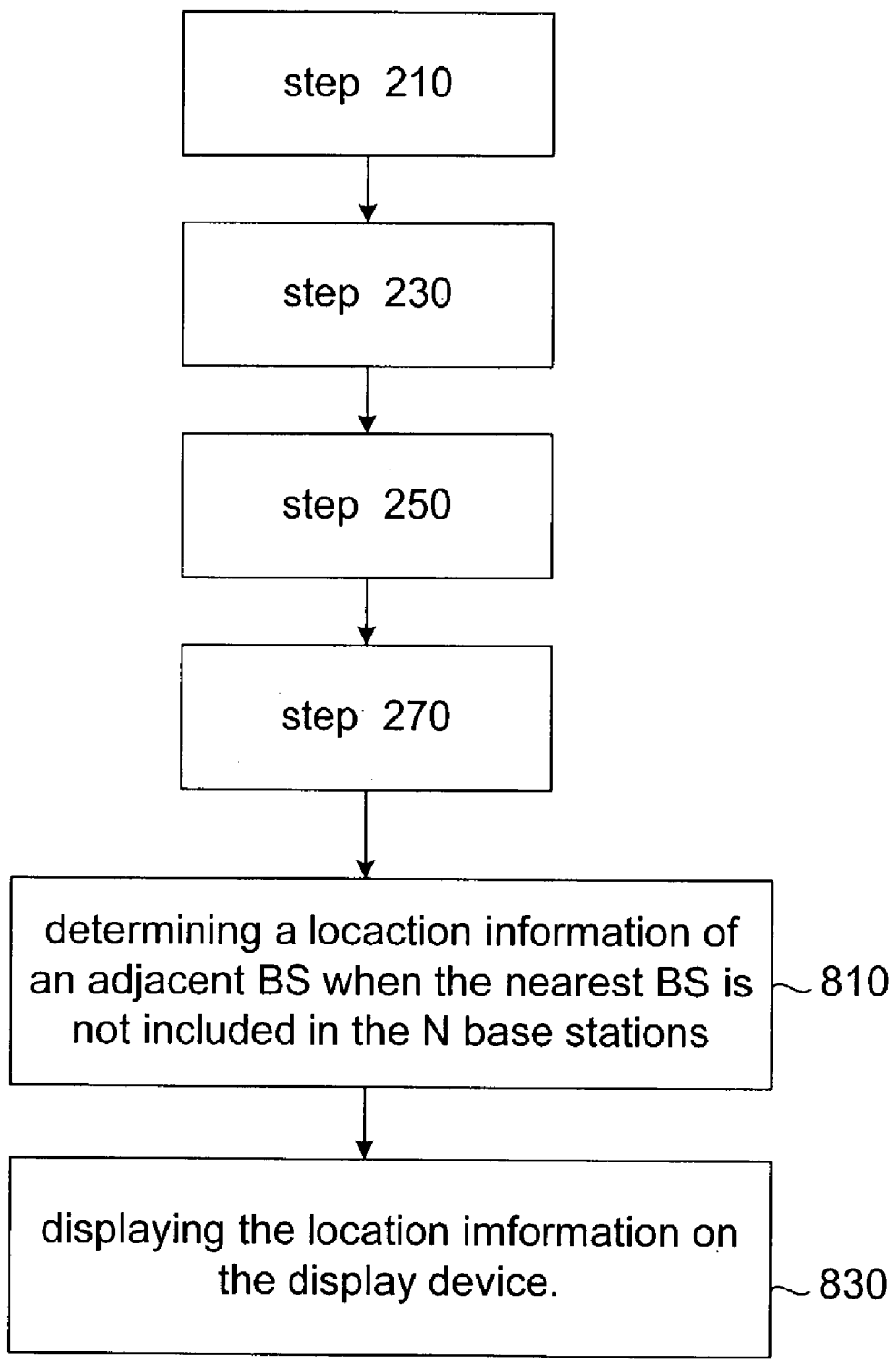
FIG. 8 shows a flow chart of the embodiment applicable to system shown is FIG. 7.

As FIG. 7 shows, due to the N base stations 430 and the M base stations 110 may merely have Q common base stations 450, it is possible that the detected nearest base station 710 does not belong to the N base stations 430, i.e. it does not belong to the Q base stations 450. The present invention further includes an embodiment shown in FIG. 8 to overcome this problem. The details of steps 210, 230, 250, 270 in this embodiment are respectively identical to the steps in embodiment shown in FIG. 2a, and this embodiment further includes step 810 and 830. In step 810, when the nearest base station 710 is not included in the N base stations 430, one location information which corresponds to an adjacent base station 730, as shown in FIG. 7, is determined as the location information of the nearest base station 710. In one embodiment, the adjacent base station 730 is selected from the Q base station 450 and is closest to the nearest base station 710. However, in another embodiment, a base station selected from the Q base stations 450 which has the strongest signal among the Q base stations 450 may be adopted as the adjacent base station 730.

In step 830, the location information of the adjacent base station 730, which is determined as the location information of the nearest base station 710 in step 810, is output on the output device 610. Similar to step 550 in FIG. 5, if there are more than one nearest base stations 710, all of the location informations of the nearest base stations 710 are displayed on the output device 610.

Those skilled in the art will readily observe that numerous modifications and alterations of the device may be made within the teaching of the invention. Accordingly, the above disclosure should be construed as limited only by the metes and bounds of the appended claims.

I claim:

1. A method for determining a location information of a mobile station, the method comprising:
    (1) pre-storing N translation relationships respectively between N identifications and N location informations of N base stations to the mobile station;
    (2) receiving M signals from M base stations respectively by the mobile station;
    (3) comparing strengths of M signals with each other to determine a first base station, having a strongest signal, and other (M-1) base stations respectively having (M-1) signals,
    (4) calculating P strength differences of the strongest signal with P signals selected from the (M-1) signals respectively;
    (5) determining the first base station as being the nearest base station when all strength differences are respectively larger than a predetermined value,
    (6) receiving the identification of the nearest base station from the nearest base station;
    (7) determining a location information corresponding to the identification of the nearest base station by using the translation relationship.

2. The method of claim 1, further comprising displaying the corresponding location information on an output device of the mobile station.

3. The method of claim 1, wherein the step (5) comprises determining both the first base station and a second base station from M base stations as being the nearest base stations when the strength difference of the strongest signal with a signal from the second base station is smaller than the predetermined value.

4. The method of claim 3, wherein the step (5) comprises determining the first base station, the second base station, and a third base station from M base stations as being the nearest base stations when the strength difference of the signal from the second base station with a signal from the third base station is smaller than the predetermined value.

5. The method of claim 3, further comprising displaying the corresponding location information of both the first base station and the second base station on an output device of the mobile station.

6. The method of claim 1, wherein a first group of M base stations belongs to a first network system, and a second group of M base stations belongs to a second network system.

7. The method of claim 6, wherein the first network system includes a home network system related to the mobile station.

8. The method of claim 6, wherein the second network system includes a visiting network system related to the mobile station.

9. The method of claim 1, wherein the strengths of the strongest signal and P signals are stronger than the strengths of other (M-P-1) signals.

10. The method of claim 1, wherein M base stations and N base stations have Q common base stations.

11. The method of claim 1, further comprising determining a location information of the nearest base station as being one location information corresponding to an adjacent base station to the nearest base station, when the nearest base station is not included in the N base stations.

12. The method of claim 11, further comprising displaying the corresponding location information of the adjacent base station on an output device of the mobile station.

13. A method for determining a location of a mobile station from M base stations, the method comprising:
  receiving M signals from M base stations respectively by the mobile station;
  comparing strengths of M signals with each other to determine a first base station, having a strongest signal, and other (M-1) base stations respectively having (M-1) signals;
  calculating P strength differences of the strongest signal with P signals selected from the (M-1) signals respectively;
  determining the first base station as being a nearest base station when all strength differences are respectively larger than a predetermined value.

14. The method of claim 13, further comprising determining both the first base station and a second base station from M base stations as being the nearest base stations when the strength difference of the strongest signal with a signal from the second base station is smaller than the predetermined value.

15. The method of claim 13, wherein N translation relationships between identifications and location information of N base stations are pre-stored in the mobile station, and the method further comprises:
  receiving the identification of the nearest base station from the nearest base station;
  determining a location information corresponding to the identification of the nearest base station by using the translation relationship.

16. The method of claim 15, further comprising displaying the corresponding location information on an output device of the mobile station.

17. The method of claim 15, wherein M base stations and N base stations have Q common base stations.

18. The method of claim 15, further comprising: determining a location information of the nearest base station as being one location information corresponding to an adjacent base station to the nearest base station, when the nearest base station is not included in the N base stations.

19. The method of claim 18, further comprising displaying the corresponding location information of the adjacent base station on an output device of the mobile station.

20. The method of claim 13, wherein a first group of the M base stations belongs to a first network system, and a second group of the M base stations belongs to a second network system.

21. The method of claim 20, wherein the first network system includes a home network system related to the mobile station.

22. The method of claim 20, wherein the second network system includes a visiting network system related to the mobile station.

23. The method of claim 13, wherein the strengths of the strongest signal and P signals are stronger than the strengths of other (M-P-1) signals.

* * * * *